(12) United States Patent
Park et al.

(10) Patent No.: US 9,050,948 B2
(45) Date of Patent: Jun. 9, 2015

(54) WIPER CONNECTOR APPARATUS HAVING ENHANCED ASSEMBLY

(71) Applicant: Dongyang Mechatronics Corp., Incheon (KR)

(72) Inventors: Wi Yeong Park, Incheon (KR); Sung Jun Yoon, Incheon (KR)

(73) Assignee: Dongyang Mechatronics Corp., Incheon (KR)

( * ) Notice: Subject to any disclaimer, the term of this patent is extended or adjusted under 35 U.S.C. 154(b) by 0 days.

(21) Appl. No.: 14/028,004

(22) Filed: Sep. 16, 2013

(65) Prior Publication Data

US 2014/0115809 A1    May 1, 2014

(30) Foreign Application Priority Data

Oct. 25, 2012    (KR) ........................ 10-2012-0119300

(51) Int. Cl.
  *B60S 1/40*    (2006.01)
  *B60S 1/38*    (2006.01)
(52) U.S. Cl.
  CPC ............... *B60S 1/386* (2013.01); *B60S 1/3849* (2013.01)
(58) Field of Classification Search
  CPC ...... B60S 1/386; B60S 1/3849; B60S 1/3848; B60S 1/4067
  USPC ............. 15/250.32, 250.43, 250.44, 250.361, 15/250.31
  See application file for complete search history.

(56) References Cited

U.S. PATENT DOCUMENTS

2008/0022829 A1    1/2008 Brosmith et al.

FOREIGN PATENT DOCUMENTS

| DE | 10036115 A1 | 7/2000 |
|---|---|---|
| DE | 102006031514 A1 | 7/2006 |
| DE | 202008011314 U1 | 8/2008 |
| DE | 102009000762 A1 | 2/2009 |
| EP | 2177407 B1 * | 8/2012 |
| KR | 10-2007-0103391 A | 10/2007 |
| KR | 10-2008-0013910 A | 2/2008 |
| KR | 10-2008-0086455 A | 9/2008 |
| KR | 10-0903374 B | 6/2009 |
| KR | 10-1189710 B | 10/2012 |
| WO | WO 2012/007028 A1 | 1/2012 |

OTHER PUBLICATIONS

Machine translation of description portion of EP2177407, published Aug. 2012.*

(Continued)

*Primary Examiner* — Gary Graham

(74) *Attorney, Agent, or Firm* — Frommer Lawrence & Haug LLP; Ronald R. Santucci

(57) ABSTRACT

A wiper connector apparatus includes a first connector member at a side of a vertebra; a second connector member that is disposed at an opposite side of the first connector member with the vertebra therebetween, wherein a first hooking unit is formed on an inner surface of the first connector member, to extend and slope against a direction of a length of the vertebra; a second hooking unit is formed on an inner surface of the second connector member in a parallel direction to the first hooking unit and not overlapping with the first hooking unit; and a coupling plate that slides into and is coupled to the first hooking unit and the second hooking unit to bind the first hooking unit and the second hooking unit so that the first hooking unit and the second hooking unit are not detached from each other.

3 Claims, 6 Drawing Sheets

(56) References Cited

OTHER PUBLICATIONS

German office action dated Mar. 25, 2014 of German patent application No. 102013221436.7; corresponds to U.S. Appl. No. 14/028,004 (English translation).

German search report dated Mar. 18, 2014 of the German patent application No. 102013221436.7 (English translation).

Notice of Allowance from Korean Patent Office for priority application 10-2012-0119300 dated Nov. 29, 2012 with English translation.

* cited by examiner

__WIPER CONNECTOR APPARATUS HAVING ENHANCED ASSEMBLY__

RELATED APPLICATIONS

This application claims the benefit of Korean Patent Application No. 10-2012-0119300, filed on Oct. 25, 2012, in the Korean Intellectual Property Office, the disclosure of which is incorporated herein in its entirety by reference.

BACKGROUND

1. Field

One or more embodiments of the present invention relate to a vehicle wiper apparatus.

2. Description of the Related Art

A blade assembly for cleaning a windshield of a vehicle is an active safety device, as well as a device that provides vehicle convenience, which is installed to ensure a driver's view by removing foreign substances or rain drops on a glass surface of the windshield.

Generally, the blade assembly for cleaning the windshield slides on and contacts the vehicle. The blade assembly for cleaning the windshield includes a wiper strip that slides on and contacts the windshield and has rubber elasticity, a vertebra that elastically supports the wiper strip, and a retainer and a coupling apparatus as a coupling assembly for firmly fixing the wiper strip to a wiper arm. Generally, the retainer has a tournament structure, so as to accommodate a deviation in contact between a wiper strip and the windshield, according to a difference in curvature of the windshield between the wiper strip and the retainer. The tournament structure may have a space between the wiper strip and the retainer. Recently, as roads have been improved for high-speed driving, and the performance of a vehicle has been enhanced, a problem of a conventional blade assembly to clean the windshield has been raised. That is, when a wiper apparatus operates while a vehicle is moving at a high speed of 160 km or more, a lift may be exerted on the blade assembly for cleaning the windshield, and the blade assembly for cleaning the windshield may not properly contact the windshield. Thus, the wiper apparatus may not properly wipe the windshield. In order to solve such a problem, there is a need to develop a new blade assembly for cleaning the windshield that does not include a retainer structure.

Recently, a wiper apparatus, referred to as a "flat-blade type wiper apparatus" has drawn attention for preventing floating of a wiper while a vehicle is moving at a high speed. In the case of the flat-blade type wiper apparatus, a vertebra that supports a wiper lip is formed of a spoiler-integrated lever, and a connector apparatus for connecting a wiper arm to the wiper apparatus is disposed at a center of the vertebra. Korean Patent Publication No. 2008-0086455 discloses an example of the flat-blade type wiper apparatus.

A conventional connector apparatus has a structure in which a pair of members, respectively on left and right sides, are coupled to each other, with a vertebra therebetween. As such, with regard to a connector apparatus that is formed by coupling the pair of members to each other, the pair of members are coupled by using an additional coupling pin or in the form of male and female coupling shapes according to a shape of the connector apparatus. In the case of the connector apparatus, since a pin is inserted into a hole in a process of coupling two members to each other, assembly process may not be efficient.

The present invention solves such a problem. One or more embodiments of the present invention include a connector apparatus having a remarkably-enhanced assembly, by improving an assembly structure of a connector apparatus that is formed by coupling two members to each other.

SUMMARY

Additional aspects will be set forth in part in the description which follows and, in part, will be apparent from the description, or may be learned by practice of the presented embodiments.

According to one or more embodiments of the present invention, a wiper connector apparatus, having enhanced assembly, which connects a wiper blade to a wiper arm includes a first connector member that is disposed at a center of the wiper blade, and at a side of a vertebra, which elastically supports a wiper hp that forms the wiper blade; a second connector member that is disposed at an opposite side of the first connector member having the vertebra therebetween, and that supports the vertebra, together with the second connector member in the form of a sandwich, wherein a first hooking unit is formed in the form of a rail on an inner surface of the first connector member, to extend and slope against a direction of a length of the vertebra; a second hooking unit is formed on an inner surface of the second connector member in a parallel direction to the first hooking unit, and not overlapping with the first hooking unit; and a coupling plate slides into and is coupled to the first hooking unit and the second hooking unit, to bind the first hooking unit and the second hooking unit so that the first hooking unit and the second hooking unit are not detached from each other.

The first hooking unit may extend in a direction that is perpendicular to an upper surface of the vertebra.

A plurality of the first hooking units and the seconds hooking units may be included and alternately disposed along a direction of a length of the vertebra.

The coupling plate may include a dislocation-preventing hook that is elastically caught in a groove which is formed in an inner wall of the first connector member or the second connector member, to thus prevent the coupling plate from being dislocated from the groove in a direction of a length of the first hooking unit or the second hooking unit.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
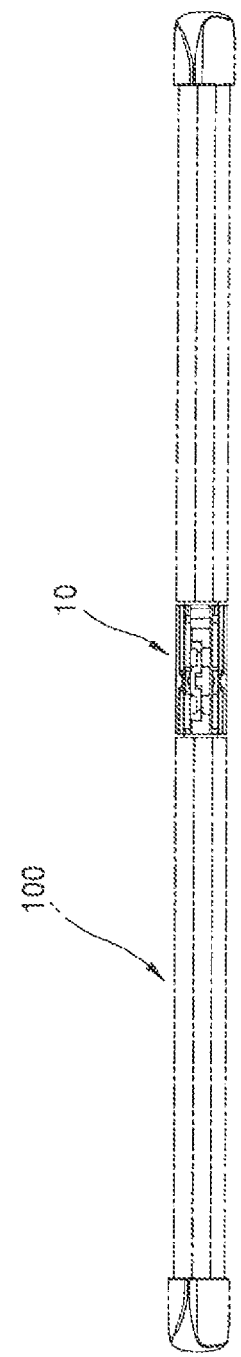
FIG. 1 is a plan view of a wiper that employs a wiper connector apparatus according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 2:
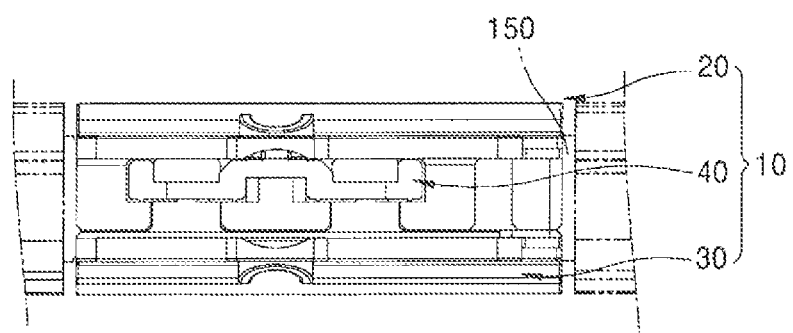
FIG. 2 is a magnified view of the wiper connector apparatus of FIG. 1.
Figure 3:
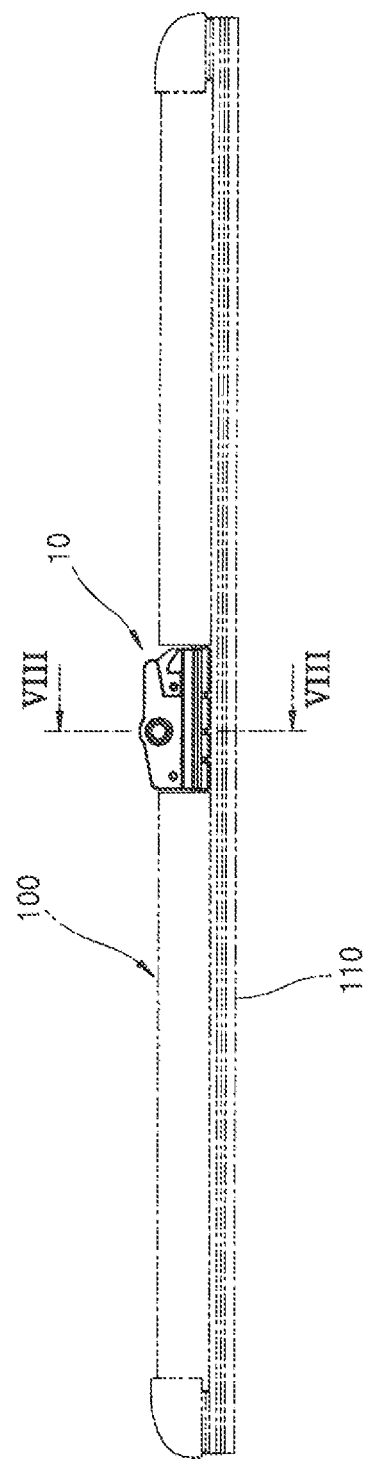
FIG. 3 is a front view of the wiper shown in FIG. 1.
Figure 4:
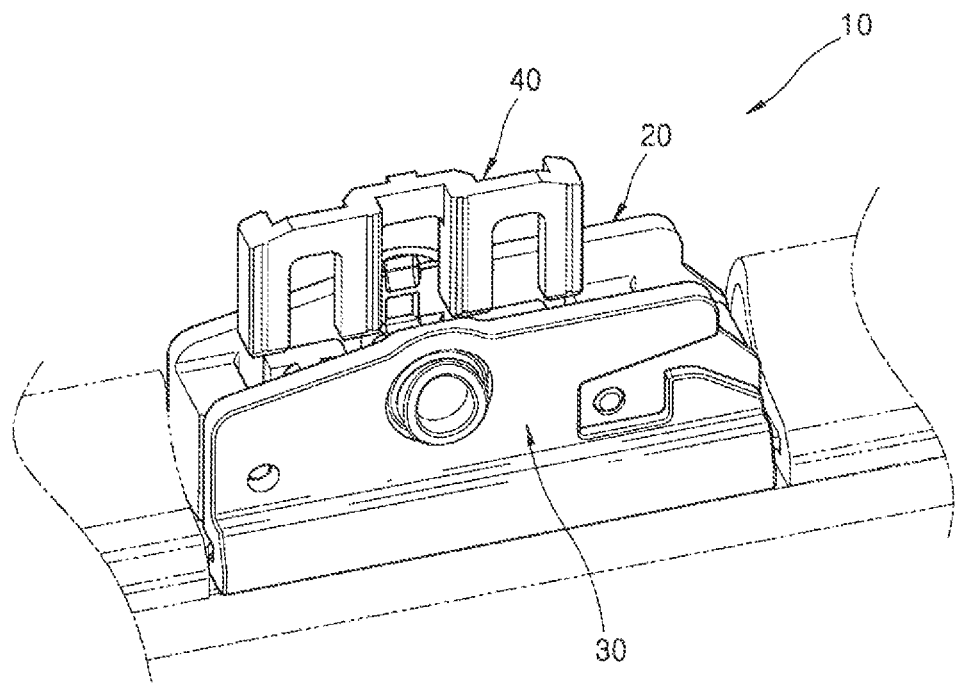
FIG. 4 is a schematic perspective view of the wiper connector apparatus of FIG. 1.
Figure 5:
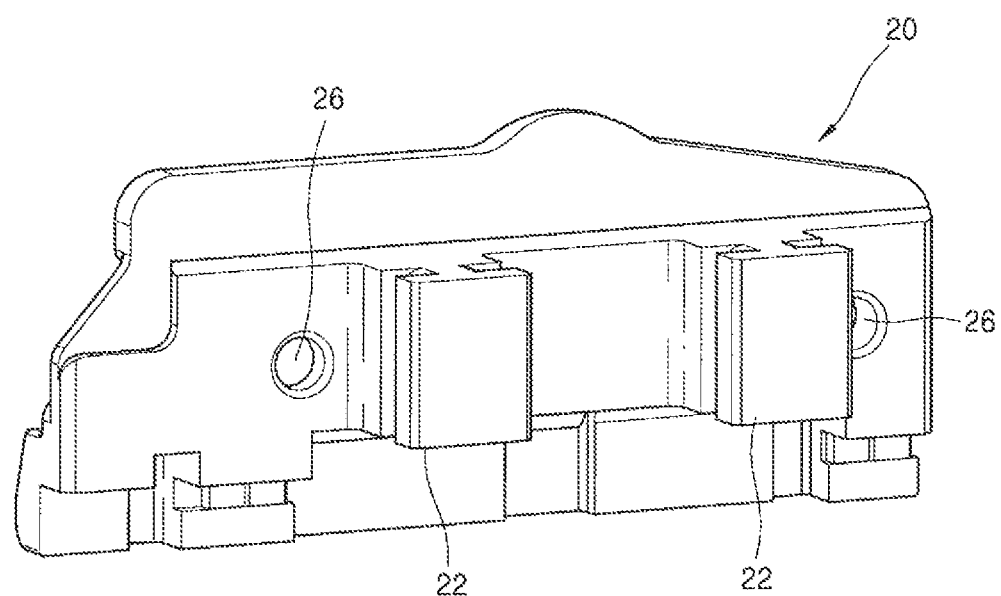
FIG. 5 is a diagram illustrating a structure of a first connector member included in the connector apparatus of FIG. 4.
Figure 6:
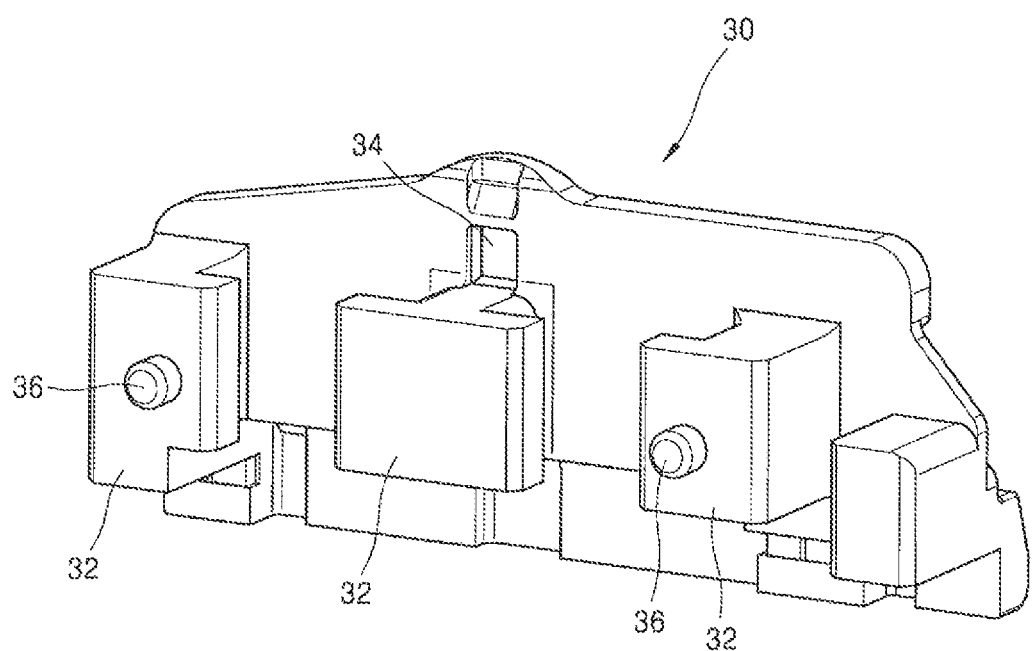
FIG. 6 is a diagram illustrating a structure of a second connector member included in the connector apparatus of FIG. 4.
Figure 7:
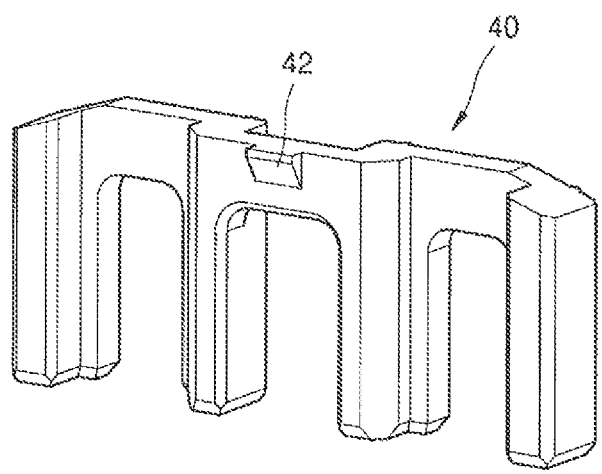
FIG. 7 is a diagram illustrating a structure of a coupling plate included in the connector apparatus of FIG. 4.
Figure 8:
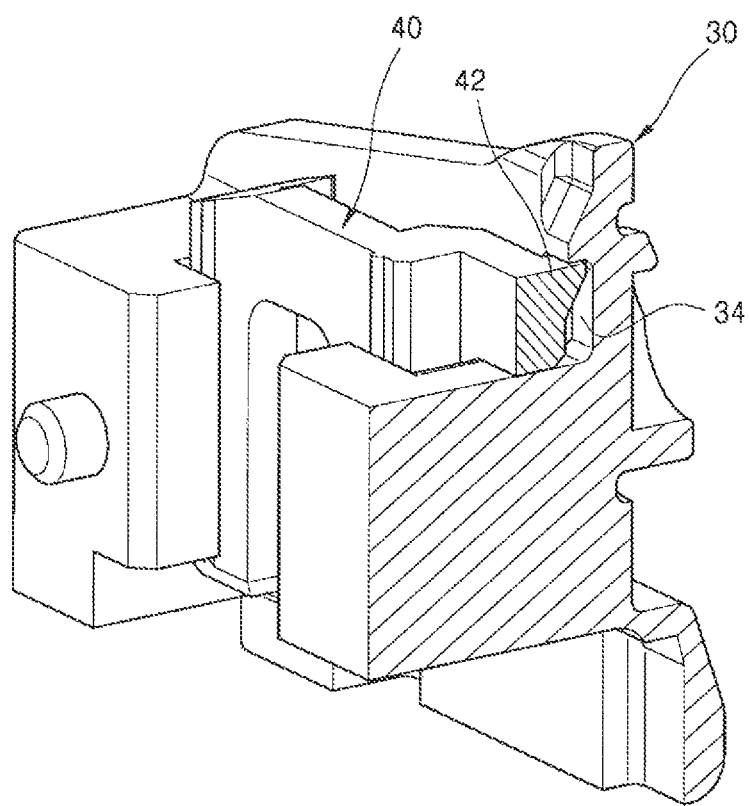
FIG. 8 is a partial cross-sectional view of the wiper of FIG. 3, taken along line VIII-VIII.

FIG. 1 is a plan view of a wiper that employs a wiper connector apparatus 10 according to an embodiment of the present invention. FIG. 2 is a magnified view of the wiper connector apparatus 10 of FIG. 1. FIG. 3 is a front view of the wiper shown in FIG. 1. FIG. 4 is a schematic perspective view of the wiper connector apparatus 10 of FIG. 1. FIG. 5 is a diagram illustrating a structure of a first connector member 20 included in the wiper connector apparatus 10 of FIG. 4. FIG. 6 is a diagram illustrating a structure of a second connector member 30 included in the wiper connector apparatus 10 of FIG. 4. FIG. 7 is a diagram illustrating a structure of a coupling plate 40 included in the wiper connector apparatus 10 of FIG. 4. FIG. 8 is a partial cross-sectional view of the wiper of FIG. 3, taken along line VIII-VIII.

Referring to FIGS. 1 through 8, according to an embodiment of the present invention, the wiper connector apparatus 10 (hereinafter, referred to as "connector apparatus") having an improved assembly is an apparatus that connects a wiper blade 100 to a wiper arm (not illustrated).

The connector apparatus 10 includes the first connector member 20, the second connector member 30, and the coupling plate 40.

The first connector member 20 is disposed at a center of the wiper blade 100. The first connector member 20 is disposed at a side of a vertebra 150, which elastically supports a wiper lip 110 that forms the wiper blade 100.

The second connector member 30 is disposed at an opposite side of the first connector member 20 with the vertebra 150 therebetween. More specifically, the second connector member 30 is disposed to face the first connector member 20 in a direction of a width of the vertebra 150, with the vertebra 150 therebetween. As a result, the first connector member 20 supports the vertebra 150, together with the second connector member 30 in the form of a sandwich.

The coupling plate 40 is employed as an intervening element for coupling the first connector member 20 to the second connector member 30. The coupling plate 40 structurally cooperates with a first hooking unit 22 and a second hooking unit 32, so as to firmly fix the first connector member 20 and the second connector member 30 to each other.

The first hooking unit 22 is formed on an inner surface of the first connector member 20. The second hooking unit 32 is formed to extend and slope against a direction of a length of the vertebra 150. More desirably, the first hooking unit 22 may extend in a direction that is perpendicular to an upper surface of the vertebra 150. The first hooking unit 22 is formed in the form of a rail. A plurality of the first hooking units 22 are included. The first hooking units 22 are disposed separate from each other along a direction of a length of the vertebra 150.

The second hooking unit 32 is formed on an inner surface of the second connector member 30. The second hooking unit 32 is formed in a parallel direction to the first hooking unit 22. The second hooking unit 32 is disposed not to overlap with the first hooking unit 22. The second hooking unit 32 is formed in the form of a rail. Desirably, in correspondence with the first hooking unit 22, the second hooking unit 32 may extend in a direction that is perpendicular to the upper surface of the vertebra 150. A plurality of the second hooking units 32 are included. The second hooking units 32 are disposed separate from each other along a direction of a length of the vertebra 150. As a result, the first hooking units 22 and the second hooking units 32 are alternately disposed along a direction of a length of the vertebra 150.

The coupling plate 40 slides into and is coupled to the first hooking units 22 and the second hooking units 32. The coupling plate 40 functions to bind the first hooking units 22 and the second hooking units 32 so that the first hooking units 22 and the second hooking units 32 are not detached from each other. That is, as the coupling plate 40 is coupled to the first hooking units 22 and the second hooking units 32, the coupling plate 40 performs a key function of preventing the first connector member 20 and the second connector member 30 from separating from each other.

The coupling plate 40 includes a dislocation-preventing hook 42. The dislocation-preventing hook 42 is formed in the form of a cantilever and protrudes from a side of the coupling plate 40. The dislocation-preventing hook 42 is elastically caught in a groove 34 that is formed in an inner wall of the first connector member 20 or the second connector member 30. Thus, the dislocation-preventing hook 42 may prevent the coupling plate 40 from being dislocated from the groove 34 in a direction of a length of the first hooking unit 22 or the second hooking unit 32. That is, the dislocation-preventing hook 42 functions as a stopper so that the coupling plate 40 is not easily separated from the first connector member 20 or the second connector member 30 in a direction in which the coupling plate 40 is assembled. Since the dislocation-preventing hook 42 is formed in the shape of a cantilever, in order to separate the coupling plate 40 from the first connector member 20 or the second connector member 30, an external force of a certain magnitude is exerted on the dislocation-preventing hook 42 so as to elastically deform the coupling plate 40. Thus, the dislocation-preventing hook 42 may be separated from the groove 34. In the current embodiment, as shown in FIG. 7, the dislocation-preventing hook 42 is provided at a center of an upper part of the coupling plate 40.

Hereinafter, a working effect of the connector apparatus 10 which includes such a configuration as described above, will be described in detail.

First, a process of coupling the connector apparatus 10 to a wiper is described.

Referring to FIGS. 5 and 6, a structure of the first hooking unit 22 and the second hooking unit 32, which are provided on the first connector member 20 and the second connector member 30, respectively, may be easily understood. The first connector member 20 is disposed to contact a corner of one end of the vertebra 150. The second connector member 30 is disposed to face the first connector member 20 with the vertebra 150 therebetween. In this process, a location-setting protruding pin 36, formed on the second connector member 30, is coupled into a location-setting hole 26 that is formed in the first connector member 20. Thus, a relative location between the first connector member 20 and the second connector member 30 is determined. In this state, the first hooking unit 22 and the second hooking unit 32 are alternately disposed. Then, the coupling plate 40 slides into and is coupled to the first hooking unit 22 in a direction of a length of the first hooking unit 22. As the coupling plate 40 is coupled to the first hooking unit 22 and the second hooking unit 32, the coupling plate 40 fixes the first connector member 20 and the second connector member 30 to each other. Accordingly, the dislocation-preventing hook 42, formed on the coupling plate 40, is accommodated in the groove 34. Thus, the coupling plate 40 may be prevented from being dislocated from the first connector member 20 or the second connector member 30.

A process of detaching the connector apparatus 10 from a wiper is as follows:

In order to detach the coupling plate 40 from the first connector member 20 or the second connector member 30, an external force is exerted on the dislocation-preventing hook 42 by using a tool such as a screwdriver. By exerting an external force on the dislocation-preventing hook 42, the dislocation-preventing hook 42 is elastically deformed, and thus, detached from the groove 34. Then, the coupling plate 40 is slid out of and detached from the first connector member 20 or the second connector member 30 along a direction of a length of the first hooking unit 22 and the second hooking unit 23, in an opposite direction in which the coupling plate 40 is coupled to the first hooking unit 22 and the second hooking unit 32 as described above. When the coupling plate 40 is detached from the first connector member 20 or the second connector member 30, since there is no element that binds the first connector member 20 with the second connector member 30, the first connector member 20 and the second connector member 30 are detached from each other.

As such, with regard to a connector apparatus in the present invention, a coupling plate may be assembled or disassembled, as the coupling plate is slid into and coupled to, or detached from the first hooking unit and the second hooking unit. Accordingly, compared to a conventional pin-type structure or a coupling structure based on a shape of the connector apparatus, assembly in the present invention may be greatly enhanced. That is, since the coupling plate is assembled or disassembled in a direction that is perpendicular to a direction in which the first connector member and the second connector member are coupled to each other, assembly may be easily performed.

As described above, according to the one or more of the above embodiments of the present invention, a connector apparatus is bound by a coupling plate that is slid into and coupled to the first connector member and the second connector member. Thus, the assembly thereof may be remarkably enhanced and the quality of a coupling state may be excellent. Additionally, as described with regard to the current embodiment, if a plurality of first hooking units and second hooking units are alternately disposed, the first connector member and the second connector member are fixed by the coupling plate at several locations. Thus, the fixability of the connector apparatus may be enhanced. Additionally, as described with regard to the current embodiment, if the dislocation-preventing hook is included, unexpected detachment of the coupling plate may be prevented.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A wiper connector apparatus, having enhanced assembly, which connects a wiper blade to a wiper arm, the wiper connector apparatus comprising:
    a first connector member that is disposed at a center of the wiper blade, and at a side of a vertebra, which elastically supports a wiper lip that forms the wiper blade;
    a second connector member that is disposed at an opposite side of the first connector member having the vertebra therebetween, and that supports the vertebra, together with the second connector member in the form of a sandwich,
    wherein a first hooking unit is formed in the form of a rail on an inner surface of the first connector member, to extend and intersect a direction of a length of the vertebra;
    a second hooking unit is formed on an inner surface of the second connector member in a parallel direction to the first hooking unit and not interfering with the first hooking unit; and
    a coupling plate slides into and is coupled to the first hooking unit and the second hooking unit to bind the first hooking unit and the second hooking unit so that the first hooking unit and the second hooking unit are not detached from each other,
    wherein the coupling plate slides into and is coupled to the first hooking unit and the second hooking unit in a direction toward a top surface of the vertebra,
    wherein a plurality of the first hooking units and the second hooking units are comprised and alternately disposed along a direction of a length of the vertebra.

2. The wiper connector apparatus of claim 1, wherein the first hooking unit extends in a direction that is perpendicular to an upper surface of the vertebra.

3. The wiper connector apparatus of claim 1, wherein the coupling plate comprises a dislocation-preventing hook that is elastically caught in a groove which is formed in an inner wall of the first connector member or the second connector member to thus prevent the coupling plate from being dislocated from the groove in a direction of a length of the first hooking unit or the second hooking unit.

* * * * *